Patented Nov. 28, 1950

2,532,055

UNITED STATES PATENT OFFICE 2,532,055

PYRIDONE DERIVATIVES

William F. Bruce, Upper Darby, Pa., assignor to Wyeth Incorporated, Philadelphia, Pa., a corporation of Delaware No Drawing. Application April 3, 1945, Serial No. 586,441

6 Claims. (Cl. 260—295.5)

This invention is concerned with the preparation of intermediates useful in the synthesis of vitamin B6 and of somewhat similar compounds having a beneficial physiological action. The invention is particularly concerned with the preparation of new derivatives of 4-alkoxymethyl-6-methyl-2-pyridone-3-carboxylic acid of the group consisting of alkyl esters of 4-alkoxymethyl - 5 - halogeno - 6 - methyl - 2 - pyridone - 3 - carboxylic acid and amides of 4-alkoxymethy-5 - halogeno - 6 - methyl - 2 - pyridone - 3 - carboxylic acid.

The following specific examples are illustrative of the compounds of the invention and suitable methods for their preparation.

EXAMPLE I

*Preparation of ethyl 4-ethoxymethyl-6-methyl-2-pyridone-3-carboxylate*

113 g. (1 mol) of ethyl cyano acetate was added to 500 cc. of ethyl alcohol in a flask equipped with a reflux condenser. 135 g. (1 mol) of ethoxy acetyl acetone and 150 cc. of piperidine were added to the solution and the whole mixture was refluxed for three hours. After cooling in the refrigerator overnight to allow the reaction product to precipitate, the ethyl 4-ethoxymethyl-6-methyl-2-pyridone-3-carboxylate was filtered off and the filtrate concentrated to a volume of 250 cc. An additional amount of the pyridone compound precipitated out from the concentrate upon cooling thoroughly. After recrystallization from alcohol, the yield amounted to 97 g. equal to 40% of the theoretical. The ethyl 4-ethoxymethyl-6-methyl-2-pyridone-3-carboxylate melts at 138 to 138.5° C., and crystallizes as fine very pale yellow needles which are soluble in hot alcohol, hot benzene and slightly soluble in hot water.

Analysis:
Calculated for: $C_{12}H_{17}O_4$   60.23% C   7.16% H
Found:                              60.46% C   7.17% H Other alkyl esters of 4-alkoxymethyl-6-methyl-2-pyridone-3-carboxylic acid in which the alkyl group contains preferably not more than five carbon atoms, may be prepared in analogous manner by substitution of the appropriate cyano acetic ester.

EXAMPLE II

*Preparation of ethyl 4-ethoxymethyl-5-bromo-6-methyl-2-pyridone-3-carboxylate*

24 g. (0.1 mol) of ethyl 4-ethoxymethyl-6-methyl-2-pyridone-3-carboxylate were dissolved in 150 cc. of glacial acetic acid and bromine added thereto until no more bromine was taken up as evidenced by a permanent coloration. The solution was then poured into 300 cc. of cold water to precipitate out the reaction product. The product was filtered off and recrystallized from alcohol. The yield of ethyl 4-ethoxymethyl - 5 - bromo - 6 - methyl - 2 - pyridone - 3 - carboxylate amounted to 26 g. equivalent to 81% of theory.

The ethyl 4-ethoxymethyl-5-bromo-6-methyl-2-pyridone-3-carboxylate crystallizes in fine white needles and melts at 181° C.

Analysis:
Calculated for: $C_{12}H_{16}O_4NBr$
                                    45.30% C   5.07% H
Found:                              45.17%     4.92%

Other alkyl esters of 4-alkoxymethyl-5-bromo-6-methyl-2-pyridone-3-carboxylic acid may be synthesized in an analogous manner by substitution of other alkyl esters of 4-alkoxymethyl-6-methyl-2-pyridone-3-carboxylic acids prepared in a manner similar to the procedure described in Example I. Likewise the alkyl esters of 5-chloro - 4 - alkoxymethyl - 6 - methyl - 2 - pyridone-3-carboxylic acids and alkyl esters of 5-iodo - 4 - alkoxymethyl - 6 - methyl - 2 - pyridone-3-carboxylic acids may be prepared by treatment of the appropriate alkyl esters of 4-alkoxymethyl - 6 - methyl - 2 - pyridone - 3 - carboxylic acids with suitable chlorinating and iodinating agents.

EXAMPLE III

*Preparation of the amide of 4-ethoxymethyl-5-bromo-6-methyl-2-pyridone-carboxylic acid*

102 g. (1 mol) of malonamide and 600 cc. of 95% alcohol were placed in a 2500 cc. round bottom flask equipped with a reflux condenser. 135 g. (1 mol) of ethoxyacetylacetone and 200 cc. of piperidine were added to the malonamide solution and the mixture was refluxed for a period of ten hours. The solution was then placed in an icebox for several hours. The product which precipitated out was filtered off and recrystallized three times from 50% alcohol to free it from traces of malonamide. The yield of the amide of 4-ethoxymethyl-6-methyl-2-pyridone-3-carboxylic acid amounted to 105 g. corresponding to 50% of the theoretical. The compound which crystallizes in fine white pellets, is insoluble in absolute alcohol, sparingly soluble in 95% alcohol, soluble in hot 50% alcohol and melts at 273 to 274° C.

Analysis:
Calculated for:
$C_{10}H_{14}O_3N_2$  57.12% C  6.71% H
Found:
57.28%  6.76%

21 g. (0.1 mol) of the amide of 4-ethoxy-methyl-6-methyl-2-pyridone-3-carboxylic acid were dissolved in 200 cc. of glacial acetic acid and the solution was heated to 70° C. Bromine was then added to the solution until the solution turned permanently reddish indicating an excess of bromine. The solution was poured into 400 cc. of cold water and enough ammonium hydroxide was added to decolorize the solution. The precipitated bromo compound was filtered off and recrystallized from acetic acid. Upon drying, the yield of the amide of 4-ethoxymethyl-5-bromo-6-methyl-2-pyridone-3-carboxylic acid amounted to 23 g. or 82% of the theoretical yield.

The amide of 4 - ethoxymethyl - 5 - bromo - 6 - methyl - 2 - pyridone - 3 - carboxylic acid crystallizes in fine white matted needles, melts with decomposition at 310° C. and is slightly soluble in hot water and soluble in acetic acid.

Analysis:
Calculated for:
$C_{10}H_{13}O_3N_2Br$  41.53% C  4.53% H
Found:
41.82%  4.45%

Likewise the amides of other 4-alkoxy-methyl-5-bromo-6-methyl-2-pyridone-3-carboxylic acids may be prepared in an analogous manner by bromination of the appropriate 4-alkoxymethyl-6-methyl-2-pyridone-3-carboxylic acid. Substitution of suitable iodinating and chlorinating agents for bromine in the above procedures results in the amides of 4-alkoxymethyl-5-bromo-6-methyl-2-pyridone-3-carboxylic acids and their amides of 4-alkoxymethyl-5-iodo-6-methyl-2-pyridone-3-carboxylic acids.

The examples given above include the best embodiments of my invention now known to me, but it is to be understood that the invention is not necessarily or specifically limited thereto and may, under proper conditions, have other embodiments, produced in other ways without departure from the spirit of the invention and within the scope of the following claims.

What I claim is:

1. In the synthesis of a 5-bromo derivative of an alkyl ester of 4-alkoxymethyl-6-methyl-2-pyridone-3-carboxylic acid, the steps of introducing elemental bromine into a solution of said ester in an organic solvent adapted to serve as a brominating medium until no more bromine is taken up by the ester, and recovering from the solution an alkyl ester of 4-alkoxy-methyl-5-bromo-6-methyl-2-pyridone-3-carboxylic acid.

2. Compounds selected from the group consisting of the amides and the alkyl esters of 4-alkoxymethyl - 5-halogeno-6-methyl-2-pyridone-3-carboxylic acids.

3. Alkyl esters of 4-alkoxymethyl-5-halogeno-6-methyl-2-pyridone-3-carboxylic acids.

4. Amides of 4-alkoxymethyl-5-halogeno-6-methyl-2-pyridone-3-carboxylic acids.

5. Ethyl 4-ethoxymethyl-5-bromo-6-methyl-2-pyridone-3-carboxylate.

6. 4 - ethoxymethyl - 5 - bromo - 6 - methyl - 2-pyridone-3-carboxylic acid amide.

WILLIAM F. BRUCE.

REFERENCES CITED

The following references are of record in the file of this patent:

UNITED STATES PATENTS

| Number | Name | Date |
|---|---|---|
| 2,371,694 | Kuhn et al. | Mar. 20, 1945 |
| 2,384,136 | Schnider | Sept. 4, 1945 |
| 2,384,137 | Schnider | Sept. 4, 1945 |

FOREIGN PATENTS

| Number | Country | Date |
|---|---|---|
| 552,808 | Great Britain | Apr. 27, 1943 |
| 550,889 | Great Britain | Jan. 20, 1945 |

OTHER REFERENCES

Moir: "Chemical Society Journal," 1902, vol. 81, part I, pages 100 to 108.

Bruce, Journal American Chemical Soc., Dec. 1944, pages 2092 to 2094.

Certificate of Correction

Patent No. 2,532,055                                                November 28, 1950

WILLIAM F. BRUCE

It is hereby certified that error appears in the printed specification of the above numbered patent requiring correction as follows:

Column 1, line 10, for "4-alkoxymethy-" read *4-alkoxymethyl-*; line 42, for "$C_{12}H_{17}O_4$" read *$C_{12}H_{17}O_4N$*;

and that the said Letters Patent should be read as corrected above, so that the same may conform to the record of the case in the Patent Office.

Signed and sealed this 30th day of January, A. D. 1951.

[SEAL]

THOMAS F. MURPHY,
*Assistant Commissioner of Patents.*